(12) United States Patent
Eggert

(10) Patent No.: US 12,340,511 B2
(45) Date of Patent: Jun. 24, 2025

(54) APPARATUS, METHOD AND COMPUTER-READABLE STORAGE MEDIUM FOR DETECTING OBJECTS IN A VIDEO SIGNAL BASED ON VISUAL EVIDENCE USING AN OUTPUT OF A MACHINE LEARNING MODEL

(71) Applicant: HOYA CORPORATION, Tokyo (JP)

(72) Inventor: Christian Eggert, Friedberg (DE)

(73) Assignee: HOYA CORPORATION, Tokyo (JP)

( * ) Notice: Subject to any disclaimer, the term of this patent is extended or adjusted under 35 U.S.C. 154(b) by 370 days.

(21) Appl. No.: 17/783,864

(22) PCT Filed: Nov. 26, 2020

(86) PCT No.: PCT/IB2020/061174
§ 371 (c)(1),
(2) Date: Jun. 9, 2022

(87) PCT Pub. No.: WO2021/116810
PCT Pub. Date: Jun. 17, 2021

(65) Prior Publication Data
US 2023/0023972 A1 Jan. 26, 2023

(30) Foreign Application Priority Data
Dec. 13, 2019 (DE) ...................... 10 2019 134 253.8

(51) Int. Cl.
*G06T 7/00* (2017.01)
*G06V 10/70* (2022.01)

(52) U.S. Cl.
CPC .......... *G06T 7/0016* (2013.01); *G06V 10/768* (2022.01); *G06T 2207/10016* (2013.01);
(Continued)

(58) Field of Classification Search
CPC ......... G06T 7/0016; G06T 2207/10016; G06T 2207/10068; G06T 2207/30032; G06V 2201/032; G06F 18/2415
See application file for complete search history.

(56) References Cited

U.S. PATENT DOCUMENTS 5,995,038 A * 11/1999 Ikizyan ................. G01S 7/2927
342/162
10,990,826 B1 * 4/2021 Haider ................... G06V 10/82
(Continued)

FOREIGN PATENT DOCUMENTS

CN 109919135 A 6/2019
CN 110349184 A * 10/2019
(Continued)

OTHER PUBLICATIONS

H. A. Qadir, et al., "Improving Automatic Polyp Detection Using CNN by Exploiting Temporal Dependency in Colonoscopy Video," in IEEE Journal of Biomedical and Health Informatics, vol. 24, No. 1, pp. 180-193, Jan. 2020, doi: 10.1109/JBHI.2019.2907434. (Year: 2020).*

(Continued)

*Primary Examiner* — Michael Robert Cammarata
(74) *Attorney, Agent, or Firm* — GREENBLUM & BERNSTEIN, P.L.C.

(57) ABSTRACT

Detections in video frames of a video signal, which are output from a machine learning model, are associated to generate a detection chain. Display of a detection in the video signal is caused based on a position of the detection in the detection chain, the confidence value of the detection and the location of the detection.

8 Claims, 6 Drawing Sheets

(52) U.S. Cl.
CPC ............... *G06T 2207/10068* (2013.01); *G06V 2201/032* (2022.01)

(56) References Cited

U.S. PATENT DOCUMENTS

| | | | |
|---|---|---|---|
| 2008/0309788 | A1 | 12/2008 | Onozawa |
| 2011/0033087 | A1* | 2/2011 | Finn ....................... G06V 20/52 |
| | | | 348/180 |
| 2011/0262002 | A1* | 10/2011 | Lee ......................... G06F 3/017 |
| | | | 382/103 |
| 2015/0146010 | A1 | 5/2015 | Yokozeki |
| 2017/0364090 | A1* | 12/2017 | Grufman .............. G05D 1/0274 |
| 2018/0242817 | A1 | 8/2018 | Imaizumi et al. |
| 2019/0113624 | A1* | 4/2019 | Robinson ................ G01S 13/72 |
| 2020/0337537 | A1 | 10/2020 | Hirasawa et al. |
| 2021/0042592 | A1* | 2/2021 | Hashimoto ........... G06V 10/764 |
| 2021/0150216 | A1* | 5/2021 | Wood ..................... G06V 20/46 |
| 2021/0182628 | A1* | 6/2021 | Regina ................... G06N 3/045 |
| 2021/0286997 | A1* | 9/2021 | Lee ........................... G06T 7/20 |
| 2022/0198778 | A1* | 6/2022 | Danielsson ......... G06F 18/2413 |
| 2024/0268651 | A1* | 8/2024 | Hayashi ............. A61B 1/00006 |

FOREIGN PATENT DOCUMENTS

| | | |
|---|---|---|
| JP | 2008-288868 A | 11/2008 |
| JP | 2015-104016 A | 6/2015 |
| WO | WO2017/073338 A1 | 5/2017 |
| WO | WO2019/088121 A1 | 5/2019 |

OTHER PUBLICATIONS

Kang, Kai, et al. "Object detection in videos with tubelet proposal networks." Proceedings of the IEEE conference on computer vision and pattern recognition. 2017. (Year: 2017).*

P. Zhang, X. Sun, D. Wang, X. Wang, Y. Cao and B. Liu, "An Efficient Spatial-Temporal Polyp Detection Framework for Colonoscopy Video," 2019 IEEE 31st International Conference on Tools with Artificial Intelligence (ICTAI), Portland, OR, USA, 2019, pp. 1252-1259, doi: 10.1109/ICTAI.2019.00-93. (Year: 2019).*

H. Zheng, H. Chen, J. Huang, X. Li, X. Han and J. Yao, "Polyp Tracking in Video Colonoscopy Using Optical Flow With an On-The-Fly Trained CNN," 2019 IEEE 16th International Symposium on Biomedical Imaging (ISBI 2019), Venice, Italy, 2019, pp. 79-82, doi: 10.1109/ISBI.2019.8759180. (Year: 2019).*

Bochinski, E. et al., "High-Speed tracking-by-detection without using image information", 14th IEEE International Conference on Advanced Video and Signal Based Surveillance (AVSS), IEEE, Aug. 29, 2017, pp. 1-6.

Hua Shuai et al., "Vehicle Tracking and Speed Estimation from Traffic Videos", 2018 IEEE/CVF Conference on Computer Vision and Pattern Recognition Workshops (CVPRW), IEEE, Jun. 18, 2018, pp. 153-160.

Gelfand, S B et al., "Adaptive detection threshold optimization for tracking in clutter", IEEE Transactionson Aerospace and Electronic Systems, IEEE Service Center, Piscataway, NJ, US, vol. 32, Apr. 1996, pp. 514-523.

Gelfand et al., "Adaptive Detection Threshold Optimization for Tracking in Clutter", American Control Conference, 1984, IEEE, Piscataway, NJ, USA, Jun. 6, 1984, pp. 619-624.

Bochinski Erik et al., "Extending IOU Based Multi-Object Tracking by Visual Information", 2018 15th IEEE International Conference on Advanced Video and Signal Based Surveillance (AVSS), IEEE, Nov. 27, 2018, pp. 1-6.

Zheng He et al., "Polyp Tracking in Video Colonoscopy Using Optical Flow With an On-The-Fly Trained CNN", 2019 IEEE 16th International Symposium on Biomedical Imaging (ISBI 2019), IEEE, Apr. 8, 2019, pp. 79-82.

Mustain Billah et al., "An Automatic Gastrointestinal Polyp Detection System in Video Endoscopy Using Fusion of Color Wavelet and Convolutional Neural Network Features", International Journal of Biomedical Imaging, vol. 2017, Jan. 2017, pp. 1-9.

Ruikai, Zhang et al., "Polyp detection during colonoscopy using a regression-based convolutional neural network with a tracker", Pattern Recognition., vol. 83, Nov. 2018, pp. 209-219.

W. Liu, D. Anguelov, D. Erhan, C., Szegedy, S. Reed, C-Y. Fu, A. C. Berg: "SSD: Single Shot MultiBox Detector", European Conference on Computer Vision, Sep. 17, 2016.

International Search Report issued in International Bureau of WIPO Patent Application No. PCT/IB2020/061174, dated Feb. 8, 2021.

Office Action issued in Japanese Patent Application No. 2022-535945, dated Jul. 4, 2023, together with English-language translation.

A Study on the Detection of Wheelchair Users Combined with Parts Tracking Authors: Ukyo Tanikawa et al. IEICE Technical Report, Jun. 2016 PRMU2016-46, SP2016-12, WIT2016-12, together with English-language counterpart.

Office Action issued in Japanese Patent Application No. 2022-535945, dated Nov. 21, 2023, together with English-language translation.

Office Action issued in Chinese Patent Application No. 202080096364. 8, dated Dec. 12, 2024.

Office Action issued in EP Patent Application No. 20817506.7, dated Jan. 14, 2025.

Hemin Ali Qadir et al. "Improving Automatic Polyp Detection Using CNN by Exploiting Temporal Dependency in Colonoscopy Video" IEEE Journal of Biomedical and Health Informatics, vol. 24, Issue: 1, Apr. 1, 2019, https://ieeexplore.ieee.org/stamp/stamp.jsp?tp=&arnumber=8678826.

Office Action issued in Japanese Patent Application No. 2024-019756, dated Dec. 10, 2024, together with an English-language translation.

* cited by examiner

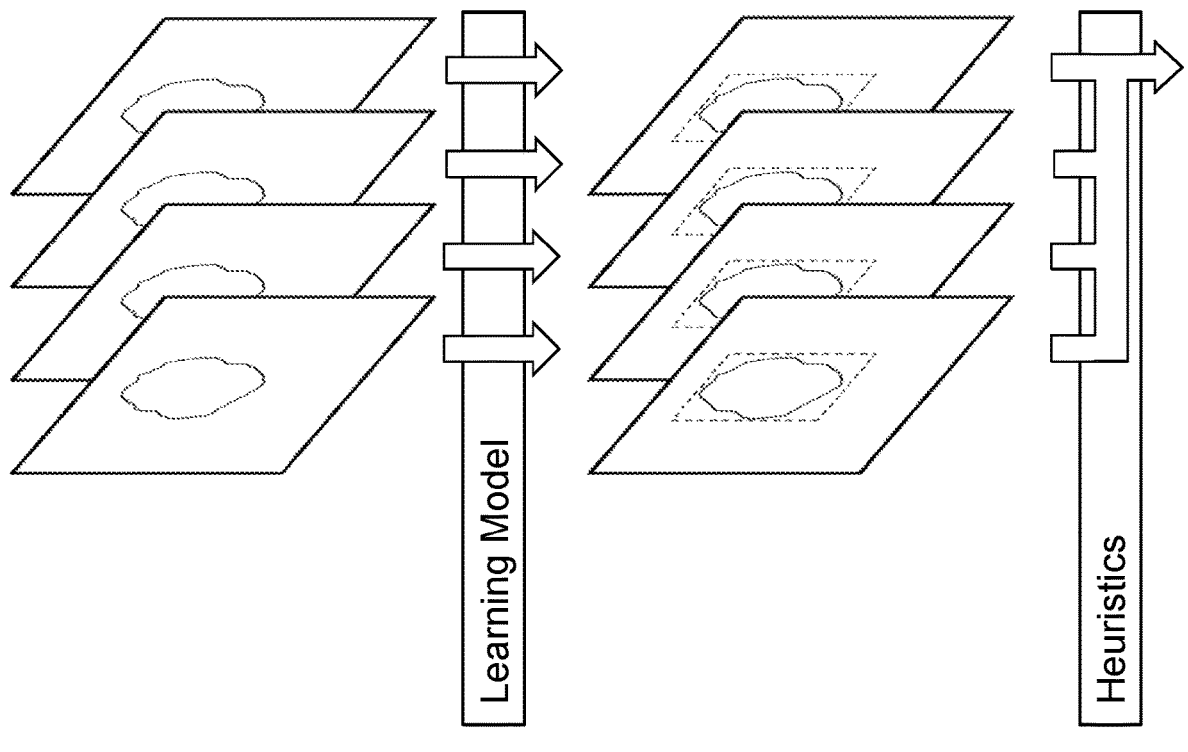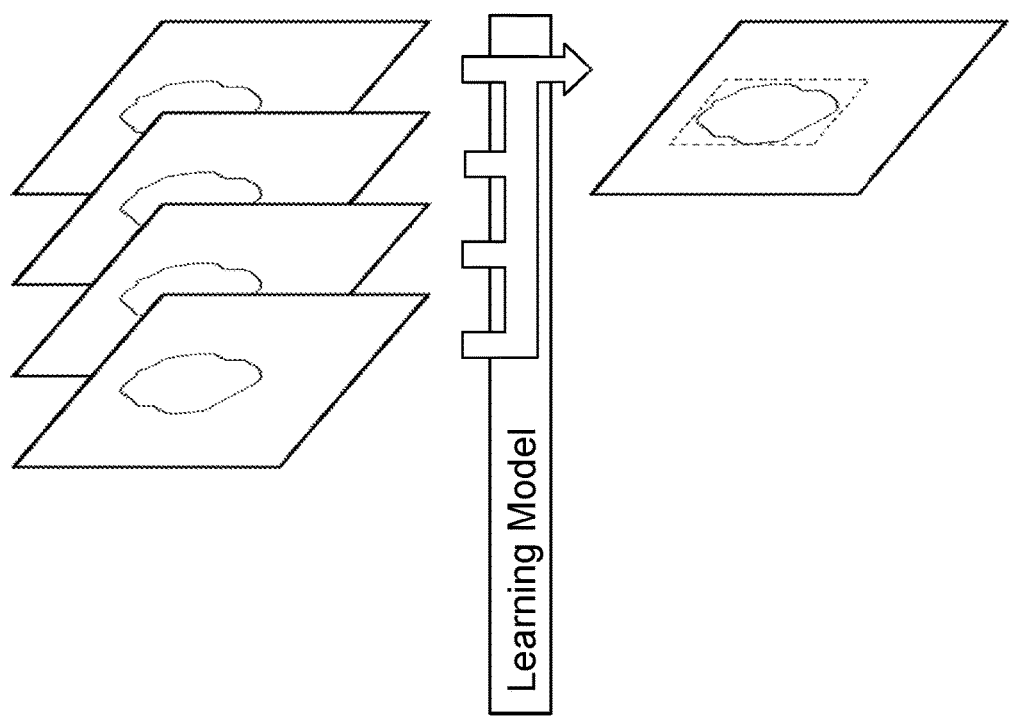
Fig. 2

APPARATUS, METHOD AND COMPUTER-READABLE STORAGE MEDIUM FOR DETECTING OBJECTS IN A VIDEO SIGNAL BASED ON VISUAL EVIDENCE USING AN OUTPUT OF A MACHINE LEARNING MODEL

TECHNICAL FIELD

The present invention relates to an apparatus, a method and a computer-readable storage medium for detecting objects in a video signal based on visual evidence using an output of a machine learning model.

BACKGROUND

Traditional machine learning can help to find a decision function which maps features relating to a detection target in an image to class labels. Machine learning algorithms have to undergo a training phase in which the decision function is modified to minimize mistakes on training data. After the training phase is complete, the decision function is fixed and used to predict previously unseen data.

For providing the machine learning algorithms with suitable features (e.g. color distribution, gradient histograms, etc.) relating to the detection target, deep learning is adopted which is a technique that is able to automatically discover suitable features.

Deep learning usually utilizes deep convolutional neural networks. Compared to traditional neural networks the first layers have been replaced by convolution operations. This allows convolutional neural networks to learn image filters which are able to extract features. Because the filter coefficients are now part of the decision function the training process can optimize the feature extraction as well. Therefore, a convolutional neural network is able to discover useful features automatically.

It has to be distinguished between classification and object class detection. For classification, the input is an image and the output a class label. Therefore, classification can answer questions like "Does this image contain a detection target, e.g. a polyp? (yes/no)". By contrast, object class detection not only provides class labels but also the location of the objects in the form of bounding boxes. It is possible to think of an object detector as a classifier which is applied on many different image patches. A well-known approach for object detection is the Single-Shot MultiBox detector (SSD) which is disclosed by W. Liu, D. Anguelov, D. Erhan, C. Szegedy, S. Reed, C-Y. Fu, A. C. Berg: "SSD: Single Shot MultiBox Detector", European Conference on Computer Vision 2016.

SUMMARY

A fundamental principle of the SSD is to place an imaginary grid of so-called anchor boxes across an image. At every location, there are multiple anchor boxes with different scales and aspect ratios. For detecting a detection target, e.g. a polyp, the question is "does this anchor box contain the detection target, e.g. polyp (yes/no)?". Therefore, a neural network with two output neurons for every anchor box is required. Depending on which of the two output neurons is activated more strongly, an anchor box is classified as positive or negative.

A detector such as the SSD provides a framework for object detection on still images.

An object of the present invention is to provide for an object detection and display mechanism which can achieve time-consistent detections in a video signal, based on an output from a machine learning model.

This object is solved by an apparatus, a method and a computer-readable storage medium as defined by the appended claims.

According to an aspect of the present invention, an apparatus is provided which comprises:

means for obtaining one or more current detections output from a machine learning model for at least one current video frame, input to the machine learning model, of a series of consecutive video frames of a video signal, wherein a current detection of the one or more current detections comprises a confidence value indicating a probability that the current detection contains a detection target to be detected by the machine learning model, and a location of the detection target in the at least one current video frame;

means for generating a detection chain by associating detections output from the machine learning model, wherein a current detection of the one or more current detections is associated with a preceding detection of one or more preceding detections obtained from the machine learning model for at least one preceding video frame of the series, that precedes the at least one current video frame and has been input to the machine learning model, wherein a preceding detection of the one or more preceding detections comprises a confidence value indicating a probability that the preceding detection contains the detection target, and a location of the detection target in the at least one preceding video frame, wherein the current detection is associated with the preceding detection based on the locations of the current and preceding detections;

means for causing display of the at least one current detection in the video signal based on a position of the current detection in the detection chain, the confidence value of the current detection and the location of the current detection; and means for repeating the obtaining, generating and causing display for at least one next video frame in the series as the at least one current video frame.

According to an embodiment of the present invention, the current detection is associated with the preceding detection such that the current detection and the preceding detection belong to the same detection chain in case an overlap of the locations of the current and preceding detections meets a predetermined condition.

According to an embodiment of the present invention, display of the current detection is caused in case the current detection belongs to N+M detections of the detection chain, where N and M are positive integers equal to or greater than 1, and wherein N indicates the N temporally first detections of the detection chain, and wherein display of the current detection is not caused in case the current detection belongs to the N temporally first detections of the detection chain.

According to an embodiment of the present invention, display of the current detection is caused in case the confidence value of the current detection is equal to or greater than a first threshold value.

According to an embodiment of the present invention, display of the current detection is caused in case the confidence value of the current detection is equal to or greater than a second threshold value smaller than the first threshold value and in case the confidence value of the preceding detection belonging to the same detection chain as the current detection is equal to or greater than the first threshold value.

According to an embodiment of the present invention, the apparatus further comprises means for performing smoothing over locations of the detections of the detection chain.

According to an embodiment of the present invention, the video signal is captured by an endoscope during an examination process.

According to an embodiment of the present invention, the detection target is a polyp.

According to an embodiment of the present invention, an object detection and display mechanism is provided that achieves time-consistent detections in a video signal, using an output of a machine learning model, based on visual evidence in video frames of the video signal.

According to an example implementation, the object detection and display mechanism processes a video signal of moving images, by using an output of a machine learning model, the object detection and display mechanism being able to suppress artifacts such as spurious detections, lost detections and unstable localization as will be described later on, while also suppressing the load on training the machine learning model.

According to an embodiment of the present invention, a heuristic approach is adopted for performing object detection in a video signal of moving images by using an output of a machine learning model, thereby visually improving the quality of detections.

With the present invention, for example, when performing an endoscopic examination such as a colonoscopy screening, a physician can be supported to focus his/her attention on relevant image regions which contain tissue that is consistent with the appearance of polyps.

In the following the invention will be described by way of embodiments thereof with reference to the accompanying drawings.

BRIEF DESCRIPTION OF THE DRAWINGS

FIG. 2 shows a diagram schematically illustrating an "ideal" solution of performing object detection in a video signal and a heuristic approach of performing object detection according to an embodiment of the present invention.

DESCRIPTION OF THE EMBODIMENTS

According to the present invention, an output of a machine learning model is used. The machine learning model outputs one or more detections per each video frame of a video signal, that is input into the machine learning model. For example, the video signal is captured by an endoscope during an examination process.

In particular, the machine learning model outputs a confidence value and a location of each detection. The confidence value indicates a probability that the detection contains a detection target to be detected by the machine learning model, and the location indicates the area of the detection target in the video frame. For example, the detection target is a polyp.

For example, as the machine learning model, a neural network with two output neurons for every anchor box as mentioned above is adopted. Depending on which of the two output neurons is activated more strongly, an anchor box is classified as positive or negative. The location of the detection target is based on the location of the anchor box. The output from the two neurons forms the confidence value.

The machine learning model has been trained using training data for object detection, i.e. training data for detection of a detection target, such as a polyp, which comprises images and annotated objects, e.g. in the form of bounding boxes.

To objectively evaluate performance improvements on datasets and filtering techniques of the machine learning model, standard metrics are used for the task of object detection. The relevant metrics used are Precision, Recall and average Precision (AP). Precision is defined as the fraction of correctly detected instances compared to the total number of detections returned by the machine learning model. Recall is defined as the fraction of correctly detected instances compared to the total number of instances to detect. Therefore, Precision and Recall formally can be defined as $$\text{Precision}=TP/(TP+FP) \quad \text{Recall}=TP/(TP+FN)$$

where TP represents the number of true positives (correct detections), FP represents the number of false positives (false detections), and FN represents the number of false negatives (missed detections).

In order to classify detections as "true" or "false", the quality of localization needs to be measured. To measure localization quality, the intersection over union (IoU) criterion is adopted:

$$IoU(A,B)=|A \cap B|/|A \cup B|$$

Figure 1:
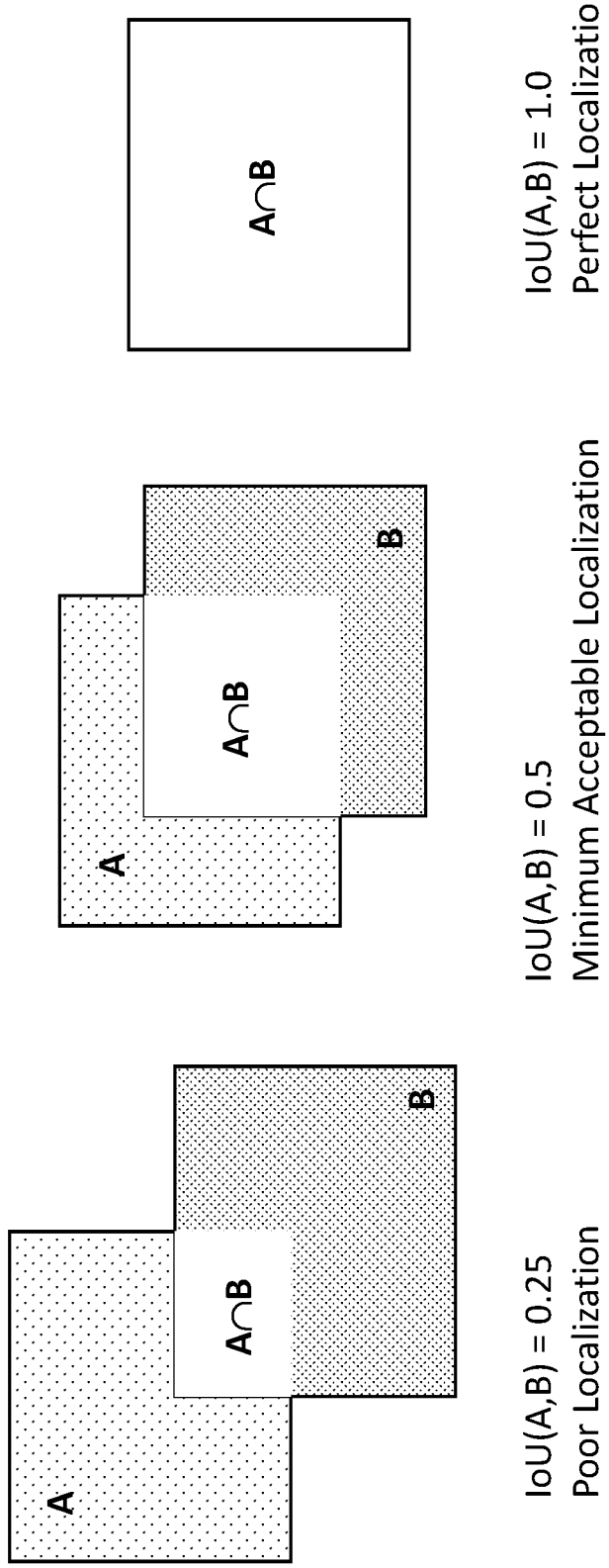
FIG. 1 shows a schematic diagram illustrating the intersection over union (IoU) criterion which, according to an embodiment of the present invention, is used for grouping detections into detection chains.

Only in the case of perfect localization the intersection over union will be 1. Both under- and over-detection are being penalized. A detection is classified as correct if the IoU between the detection and the annotation is ≥0.5. FIG. 1 illustrates examples for poor localization, minimum acceptable localization, and perfect localization.

Although precision and recall are useful tools for evaluating the performance of an algorithm, they suffer from a serious drawback: The classifier outputs a confidence value which measures the probability that an image region contains a detection target such as a polyp. For a final decision whether to display the detection, a threshold needs to be applied. However, the values of precision and recall are dependent on this threshold. For example, it is always possible to increase precision at the cost of recall by increasing the threshold.

Hence, in FIGS. 5 and 7 which will be described later on, precision (P) and recall (R) are evaluated over all possible thresholds to plot a precision-recall curve. The area under the curve is called average precision (AP) and serves as an indicator how well different classifiers perform in general. This value can be used to compare different classifiers with each other.

In the following it is assumed that the machine learning model the output of which is used in the present invention has been trained to achieve a good performance when producing detections based on a video frame of a video signal. However, information from past video frames might be able to improve the performance even further.

Producing detections only based on the current video frame can lead to the following artifacts:

Spurious detections: False positives which tend to appear for a single image frame of a video signal and disappear in the next frame of the video signal.

Lost detections: When the machine learning model has detected a detection target, e.g. a polyp, the detection is usually very stable across multiple consecutive frames of the video signal. However, sometimes the confidence of the detection will briefly drop below the detection threshold which will cause the detection to flicker.

Unstable localization: The machine learning model will estimate a bounding box to localize each detection. If the input image changes slightly, the localization will change as well. However, this change might not appear to be smooth to a user.

A detector which is able to consider past video frames might have a good chance to reduce these artifacts. However, training such a detector would require collecting video sequences as datasets. This would place a huge burden on the physicians since they would be required to label every single frame in the video signal.

In order to avoid training the machine learning model using video sequences, according to the present invention, a heuristic solution to visually improve the quality of detections is employed. For this purpose, a filtering heuristic is introduced which addresses the above-mentioned artifacts. FIG. 2 shows a diagram schematically illustrating an "ideal" solution and the solution according to the present invention.

The "ideal" solution is shown on the left hand side of FIG. 2. For example, a deep convolutional neural network (DCNN) long short-term memory (LSTM) architecture takes multiple video frames as input and outputs detections based on visual evidence across multiple frames.

The solution according to the present invention is shown on the right hand side of FIG. 2. Prediction is based on individual frames, filtered through heuristics.

The difference between both solutions is that a true multi-frame detector would be able to rely on the visual evidence from multiple video frames. The heuristic solution according to the present invention relies on the visual evidence of the current frame to produce a detection. As described above, a detection comprises a location and a confidence value. Therefore, the heuristic can operate on these values.

According to an embodiment of the present invention, before a filter heuristic is applied, detections are associated with each other across multiple video frames. According to an embodiment of the present invention, it is assumed that detections generally do not tend to move fast across consecutive video frames, and the locations of the detections are used to associate detections with each other. According to an implementation example, the previously described intersection over union criterion is used to associate detections with each other. For example, detections in consecutive video frames with an IoU 0.3 are considered to be part of the same detection chain. Consecutive detections with an IoU<0.3 are considered to be part of different detection chains. Filtering stages to be described in the following each operate on these detection chains.

Figure 3:
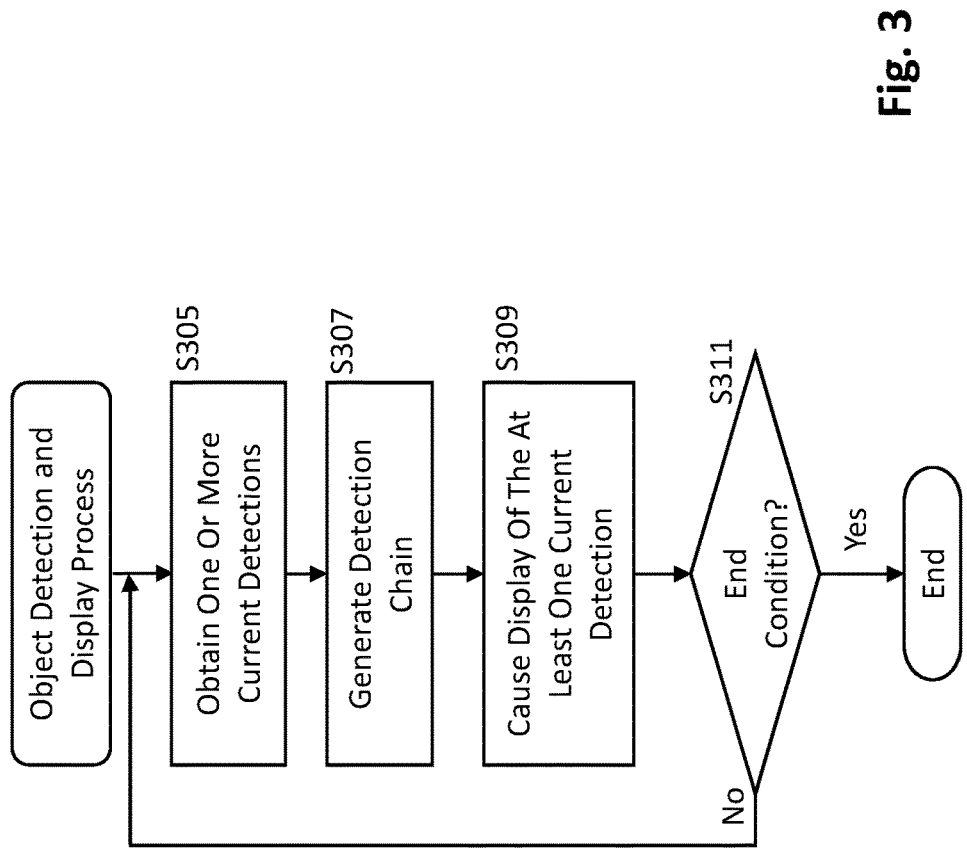
FIG. 3 shows a flowchart illustrating an object detection and display process according to an embodiment of the present invention.

Before describing the filtering stages, reference is made to FIG. 3 illustrating a process of object detection and display according to an embodiment of the present invention.

In step S305 of FIG. 3, one or more current detections for at least one current video frame input to a machine learning model is (are) obtained as output from the machine learning model. The at least one current video frame belongs to a series of consecutive video frames of a video signal. According to an example implementation, the video signal is acquired from an endoscopic device which captures the video signal. For example, the video signal comprises moving images.

A current detection of the one or more current detections comprises a confidence value indicating a probability that the current detection contains a detection target to be detected by the machine learning model, and a location of the detection target in the at least one current video frame. In step S305, the one or more current detections for the at least one current video frame is (are) obtained.

In step S307, a detection chain is generated by associating detections output from the machine learning model. A current detection of the one or more current detections is associated with a preceding detection of one or more preceding detections obtained from the machine learning model for at least one preceding video frame of the series, that precedes the at least one current video frame and has been input to the machine learning model. A preceding detection of the one or more preceding detections comprises a confidence value indicating a probability that the preceding detection contains the detection target, and a location of the detection target in the at least one preceding video frame. According to an embodiment of the present invention, the current detection is associated with the preceding detection based on the locations of the current and preceding detections. According to an alternative embodiment or in addition, the current detection is associated with the preceding detection based on at least one of speed and orientation of the detections in the consecutive video frames.

In step S309, display of the at least one current detection in the video signal is caused based on a position of the current detection in the detection chain, the confidence value of the current detection and the location of the current detection.

In step S311 it is checked whether or not an end condition is satisfied. In case the end condition is satisfied, the process ends. In case the end condition is not satisfied, the process returns to step S305 to process at least one next video frame in the series as the at least one current video frame.

For example, the end condition is fulfilled in case there is no next video frame in the series.

According to an example implementation, in step S307 the current detection is associated with the preceding detection such that the current detection and the preceding detection belong to the same detection chain in case an overlap of the locations of the current and preceding detections meets a predetermined condition, for example IoU 0.3.

Further, according to an example implementation, in step S309 display of the current detection is caused in case the confidence value of the current detection is equal to or greater than a first threshold value.

Figure 4:
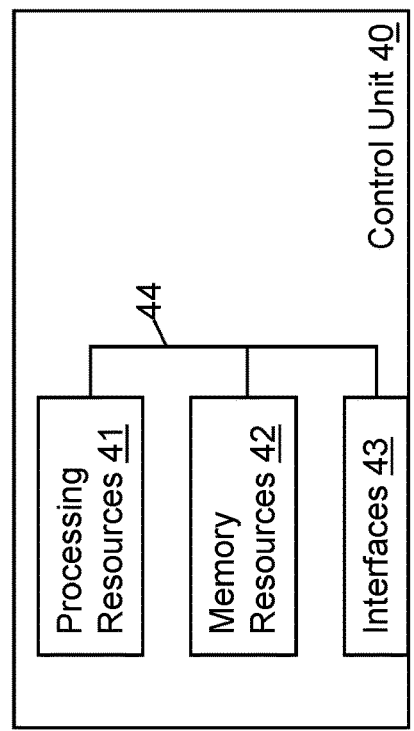
FIG. 4 shows a schematic block diagram illustrating a configuration of a control unit in which examples of embodiments of the invention are implementable.

Now reference is made to FIG. 4 illustrating a control unit 40 in which examples of embodiments of the invention are implementable. For example, the control unit 40 implements the object detection and display process of FIG. 3.

The control unit 40 comprises processing resources (e.g. processing circuitry) 41, memory resources (e.g. memory circuitry) 42 and interfaces (e.g. interface circuitry) 43, which are connected via a link (e.g. a bus, a wired connection, a wireless connection, etc.) 44.

According to an example implementation, the memory resources 42 store a program that when executed by the processing resources 41 causes the control unit 40 to operate according to at least some embodiments of the present invention.

In general, the exemplary embodiments of this invention may be implemented by computer software stored in the memory resources 42 and executable by the processing resources 41, or by hardware, or by a combination of software and/or firmware and hardware.

In the following, filtering stages will be described, which operate on detection chains obtained as explained above.

Filtering Stage 1: Flicker Suppression

Flicker suppression is designed to address the problem of spurious detections. Since spurious detections only appear for a few frames and then disappear again, a solution to mitigate this problem is to suppress the first occurrences of a detection in the image. For example, only if a detection target, e.g. a polyp, has been detected independently in multiple subsequent video frames in the same location, the detection corresponding to the location is displayed in S309.

There are two different ways to implement such a flicker suppression. One way is a suppression without foreknowledge which always suppresses the first N occurrences of a detection. Another way is a suppression with foreknowledge which only suppresses the first N occurrences of a detection if the detection has disappeared in the N+1-th frame.

Both versions have the effect of increasing the precision of the object detection and display mechanism. However, because detections are suppressed deliberately, the recall is bound to suffer. This decrease in recall will be greater if flicker suppression without foreknowledge is employed than if flicker suppression with foreknowledge is employed. However, there will be a delay of N+1 frames until knowledge is acquired whether to display a detection or not. Because such a latency usually is not acceptable, using flicker suppression without foreknowledge is preferred.

According to an example implementation of the object detection and display process of FIG. 3, in step S309 display of the current detection is caused in case the current detection belongs to N+M detections of the detection chain, where N and M are positive integers equal to or greater than 1, and wherein N indicates the N temporally first detections of the detection chain. Further, display of the current detection is not caused in case the current detection belongs to the N temporally first detections of the detection chain.

Figure 5:
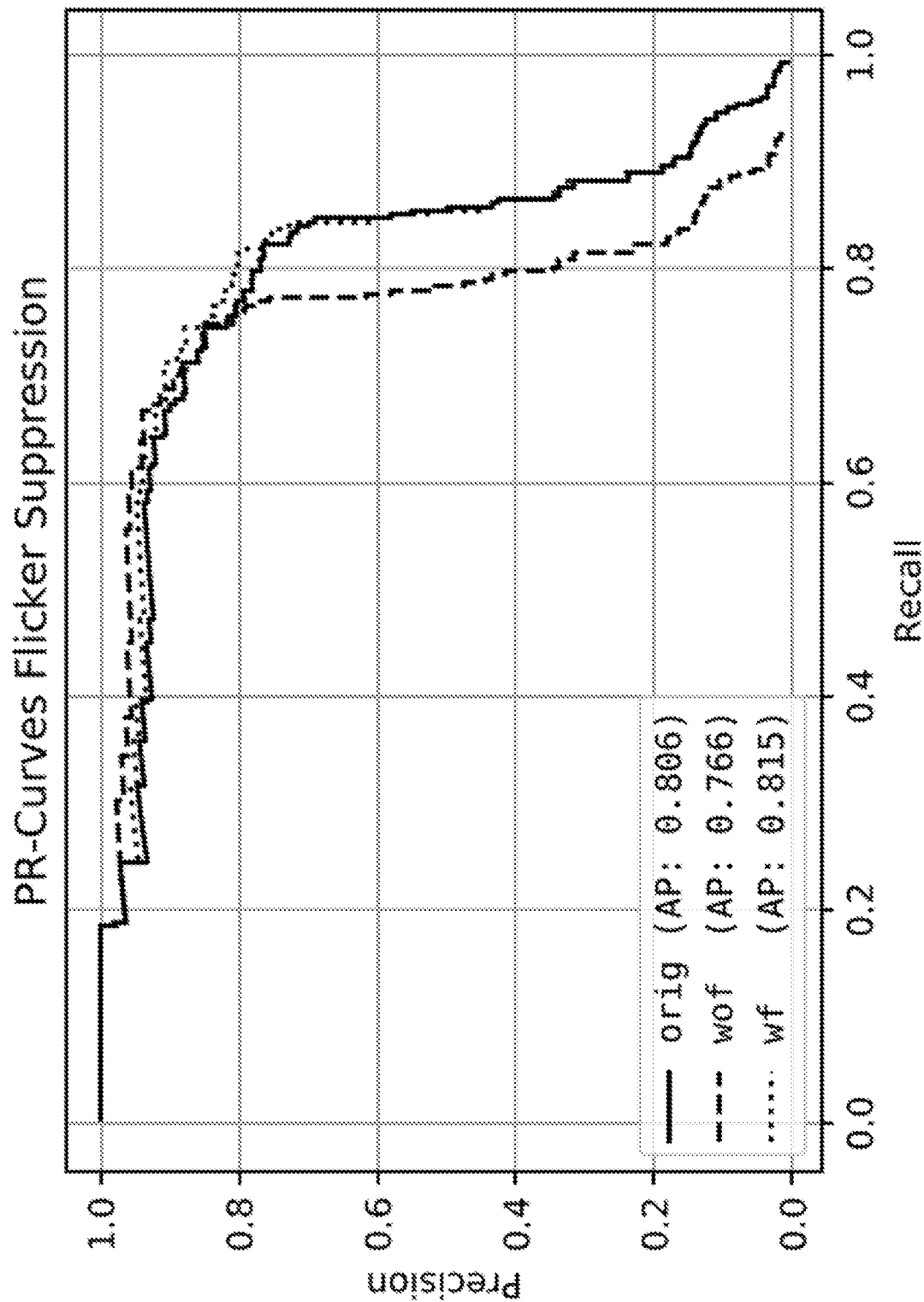
FIG. 5 shows a diagram illustrating a PR curve when flicker suppression is applied in the object detection and display process according to an embodiment of the present invention.

In FIG. 5, precision and recall are evaluated over all possible thresholds to plot precision-recall (PR) curves for (1) the original dataset (i.e. no flicker suppression applied in the object detection and display process of FIG. 3), (2) the dataset with flicker suppression without foreknowledge (wof) applied in the object detection and display process of FIG. 3, and (3) the dataset with flicker suppression with foreknowledge (wf) applied in the object detection and display process of FIG. 3.

As described in the foregoing, the area under the curves is called average precision (AP) and serves as an indicator how well the object detection and display process of FIG. 3 works (1) without flicker suppression, (2) with flicker suppression without foreknowledge, and (3) with flicker suppression with foreknowledge.

FIG. 5 shows the effect of applying flicker suppression with and without foreknowledge. The maximum achievable recall is reduced while the precision in the high-precision part of the detector's (e.g. the machine learning model's) characteristic is improved. Both effects are less pronounced if flicker suppression with foreknowledge is employed. The increase in precision is highly visible to the user while the decrease in recall is not because for most application scenarios the detector (e.g. the machine learning model) will have its operating point in the high-precision region of the PR curve.

Although applying flicker suppression without foreknowledge means that recall is decreased more strongly, this lost recall is hardly noticeable to the user. A few missing detections after the polyp comes into view are much less noticeable than false positives popping up all over the image and immediately disappearing.

Filtering Stage 2: Hysteresis

Sometimes, the opposite of flickering detections occur: Detections are briefly lost for a single frame and quickly detected again in the next frame. For example, this can happen when motion blur occurs.

Figure 6:
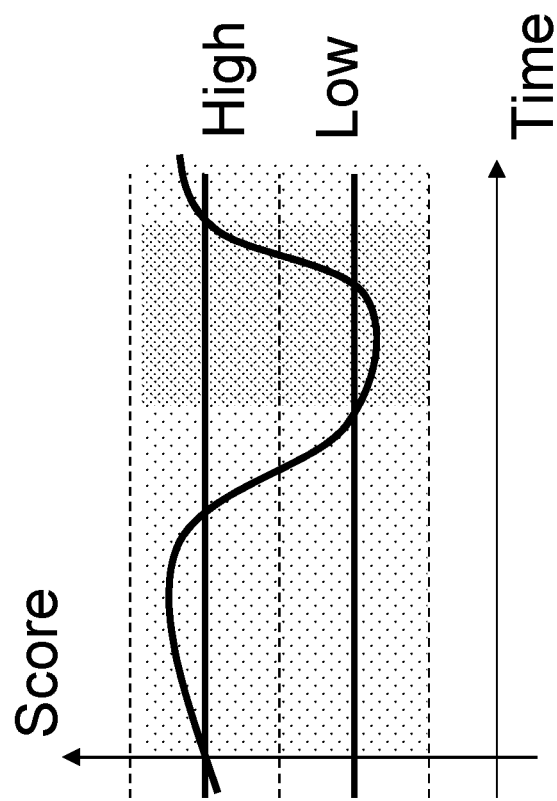
FIG. 6 shows a diagram illustrating hysteresis thresholding to be applied in the object detection and display process according to an embodiment of the present invention.

In order to counter these lost detections, hysteresis thresholding is introduced as illustrated in FIG. 6.

Hysteresis thresholding uses two thresholds: A first threshold called high threshold (referred to as "high" in FIG. 6) and a second threshold called low threshold (referred to as "low" in FIG. 6). Initially, confidence values of detections have to exceed the high threshold in order to be displayed. In other words, initially a detection is displayed in case it is detected in multiple frames (e.g. over time as illustrated in FIG. 6) with high-confidence at a similar location. If a detection has been displayed at a similar location for several frames, the detection is allowed to fall below the high threshold and still be displayed. Only once the detection falls below the low threshold, it is not being displayed anymore. In FIG. 6, the confidence value is indicated as "score".

According to an example implementation, in step S309 of FIG. 3, display of the current detection is caused in case the confidence value of the current detection is equal to or greater than a second threshold value smaller than the first threshold value and in case the confidence value of the preceding detection belonging to the same detection chain as the current detection is equal to or greater than the first threshold value.

Figure 7:
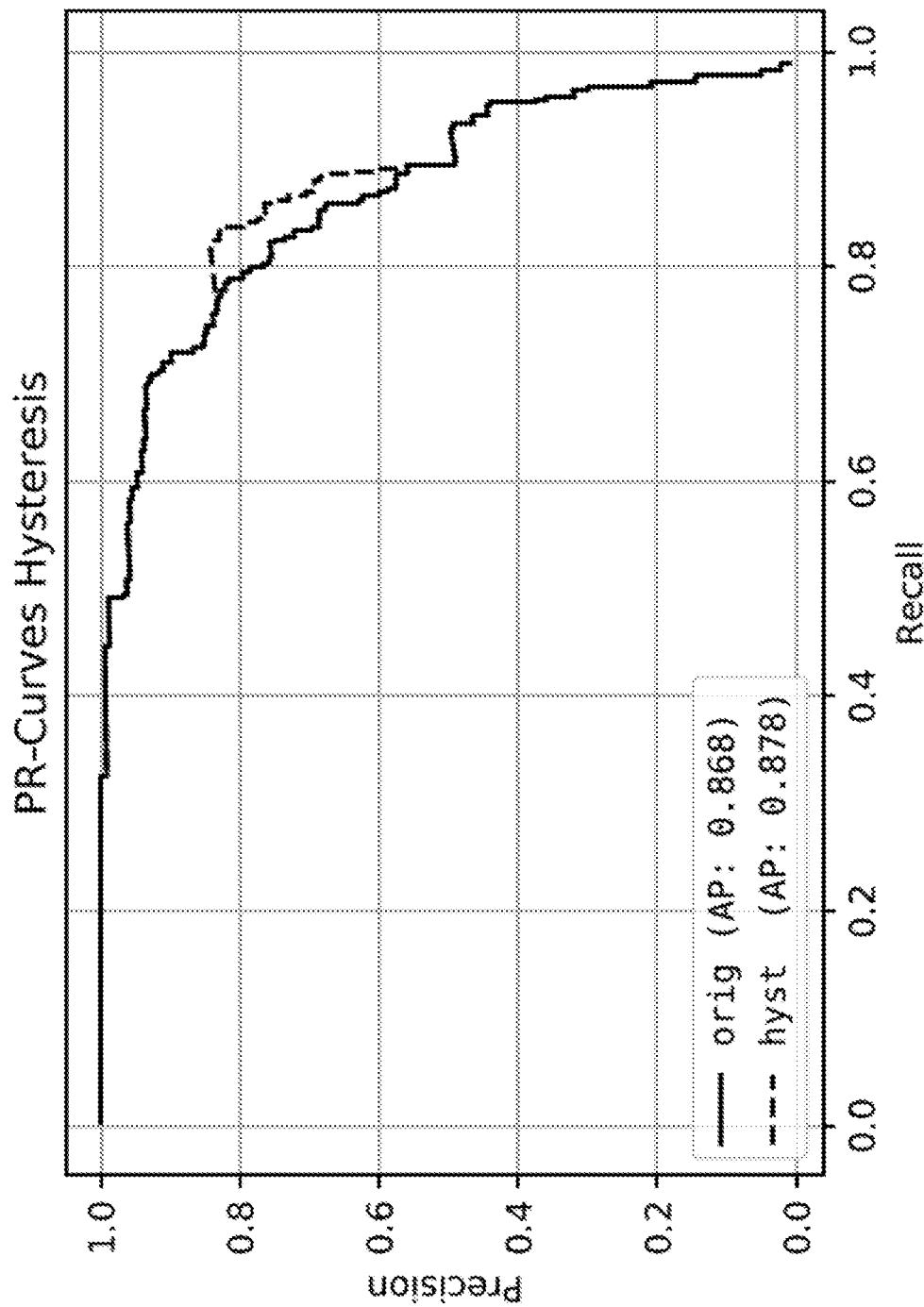
FIG. 7 shows a diagram illustrating a PR curve when the hysteresis thresholding is applied in the object detection and display process according to an embodiment of the present invention.

FIG. 7 shows a typical effect of the application of hysteresis thresholding in the object detection and display process of FIG. 3. For a given precision the recall can be improved. A potential reduction in precision is not observable in practice.

It is to be noted that the PR curves shown in FIGS. 5 and 7 have been obtained based on different datasets.

Since hysteresis thresholding results in more detected polyps, it can increase the recall. Potentially it can also result in a decrease in precision since some of these detections might turn out to be incorrect. However, since neural networks are generally very good at assigning high confidence values when a polyp is really present and very low confidence values when a polyp is not present, such a problem has not been encountered. In such a case, the confidence value of the network will generally not even exceed the low threshold.

Filtering Stage 3: Location Smoothing

In filtering state 3, smoothing over the locations of the detections is performed.

According to an example implementation, in step S309 in FIG. 3, when display of the at least one current detection is caused, its location is smoothed based on the locations of detections of the detection chain which the current detection belongs to, wherein the detections precede the current detection.

For example, smoothing is done by performing a weighted average of coordinates of the detections. This creates the appearance that the localization is more stable than it originally is. Alternatively, smoothing can be performed using more complex filtering structures, e.g. by applying a Kalman filter to the locations of the detections in the video signal.

Effects

The combined effect of the above-described approach applying heuristic filtering stages 1 to 3 has been evaluated on a large test dataset of 6000 images. On average a reduction in false positive detections by 62% has been observed compared to without heuristic filtering. Similarly, a 16% increase in false negatives has been observed. Again, it is noted that the reduction in false positives is highly visible while the reduction in false negatives is hardly visible: A few frames where a polyp is not detected when it comes into view are technically measures as false negatives. However, to a human user, this is hardly visible. However, false positives which pop up all over the video are very noticeable to the user.

At this point it is also noted that a 16% increase in false negatives does not mean that 16% more polyps are missed during a colonoscopy. It means that there is a 16% increase in video frames in which a polyp is present but not detected. However, there are typically many video frames which depict the same polyp. If the network is good at detecting polyps, it is virtually certain that at least one video frame is encountered, in which a specific polyp is detected. In practice, the heuristic filtering does not affect the number of polyps which are detected at least once.

The above described object detection and display mechanism is able to reliably detect polyps during colonoscopies in real-time.

The three-staged heuristic filtering approach enables filtering detections over frames of a video signal, i.e. over time. Therefore, individual detections appear more stable although the object detection and display mechanism operates on video frames, e.g. single video frames. This heuristic filtering improves results visually and allows time-consistent detections without requiring video data (and the corresponding annotations) during training.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
obtaining one or more current detections output from a machine learning model for at least one current video frame, input to the machine learning model, of a series of consecutive video frames of a video signal, wherein a current detection of the one or more current detections comprises a confidence value indicating a probability that the current detection contains a detection target to be detected by the machine learning model, and a location of the detection target in the at least one current video frame;

generating a detection chain by associating detections output from the machine learning model, wherein a current detection of the one or more current detections is associated with a preceding detection of one or more preceding detections obtained from the machine learning model for at least one preceding video frame of the series, that precedes the at least one current video frame and has been input to the machine learning model, wherein a preceding detection of the one or more preceding detections comprises a confidence value indicating a probability that the preceding detection contains the detection target, and a location of the detection target in the at least one preceding video frame, wherein the current detection is associated with the preceding detection based on the locations of the current and preceding detections; and causing display of the at least one current detection in the video signal based on a position of the current detection in the detection chain, the confidence value of the current detection and the location of the current detection, wherein the obtaining, generating and causing display are repeated for at least one next video frame in the series as the at least one current video frame, and wherein the causing display is performed in case the confidence value of the current detection is:
equal to or greater than a first threshold value, and
equal to or greater than a second threshold value smaller than the first threshold value and in case the confidence value of the preceding detection belonging to the same detection chain as the current detection is equal to or greater than the first threshold value, such that hysteresis thresholding is performed and flicker is avoided.

2. The method of claim 1, wherein the current detection is associated with the preceding detection such that the current detection and the preceding detection belong to the same detection chain in case an overlap of the locations of the current and preceding detections meets a predetermined condition.

3. The method of claim 1, wherein display of the current detection is caused in case the current detection belongs to N+M detections of the detection chain, where N and M are positive integers equal to or greater than 1, and wherein N indicates the N temporally first detections of the detection chain, and wherein display of the current detection is not caused in case the current detection belongs to the N temporally first detections of the detection chain.

4. The method of claim 1, further comprising:
performing smoothing over locations of the detections of the detection chain.

5. The method of claim 1, wherein the video signal is captured by an endoscope during an examination process.

6. The method of claim 1, wherein the detection target is a polyp.

7. A computer-readable non-transitory storage medium storing a program that when executed by a computer causes the computer to perform the method of claim 1.

8. An apparatus comprising at least one processor and at least one memory including computer program code, the at least one memory and the computer program code configured to, with the at least one processor, cause the apparatus at least to perform:
obtaining one or more current detections output from a machine learning model for at least one current video frame, input to the machine learning model, of a series of consecutive video frames of a video signal, wherein a current detection of the one or more current detections comprises a confidence value indicating a probability that the current detection contains a detection target to be detected by the machine learning model, and a location of the detection target in the at least one current video frame;

generating a detection chain by associating detections output from the machine learning model, wherein a current detection of the one or more current detections is associated with a preceding detection of one or more preceding detections obtained from the machine learning model for at least one preceding video frame of the series, that precedes the at least one current video frame and has been input to the machine learning model, wherein a preceding detection of the one or more preceding detections comprises a confidence value indicating a probability that the preceding detection contains the detection target, and a location of the detection target in the at least one preceding video frame, wherein the current detection is associated with the preceding detection based on the locations of the current and preceding detections;

causing display of the at least one current detection in the video signal based on a position of the current detection in the detection chain, the confidence value of the current detection and the location of the current detection; and repeating the obtaining, generating and causing display for at least one next video frame in the series as the at least one current video frame, wherein the causing display is performed in case the confidence value of the current detection is:
  equal to or greater than a first threshold value, and
  equal to or greater than a second threshold value smaller than the first threshold value and in case the confidence value of the preceding detection belonging to the same detection chain as the current detection is equal to or greater than the first threshold value, such that hysteresis thresholding is performed and flicker is avoided.

* * * * *